US011875354B2

(12) United States Patent
Kulasekaran

(10) Patent No.: US 11,875,354 B2
(45) Date of Patent: Jan. 16, 2024

(54) SYSTEM AND METHODS FOR IDENTIFYING COUNTERFEIT CHECKS USING DIMENSIONAL REDUCTION OF SERIAL NUMBERS

(71) Applicant: Actimize LTD., Ra'anana (IL)

(72) Inventor: Uma Shankar Kulasekaran, Alpharetta, GA (US)

(73) Assignee: ACTIMIZE LTD., Ra'anana (IL)

( * ) Notice: Subject to any disclaimer, the term of this patent is extended or adjusted under 35 U.S.C. 154(b) by 92 days.

(21) Appl. No.: 17/550,259

(22) Filed: Dec. 14, 2021

(65) Prior Publication Data
US 2023/0186310 A1    Jun. 15, 2023

(51) Int. Cl.
    G06Q 40/00      (2023.01)
    G06Q 20/40      (2012.01)
    G06N 20/00      (2019.01)
    G06F 17/16      (2006.01)

(52) U.S. Cl.
    CPC ......... G06Q 20/4016 (2013.01); G06F 17/16 (2013.01); G06N 20/00 (2019.01)

(58) Field of Classification Search
    CPC ..... G06Q 20/4016; G06N 20/00; G06F 17/16
    See application file for complete search history.

(56) References Cited

U.S. PATENT DOCUMENTS

| | | | |
|---|---|---|---|
| 6,181,814 B1* | 1/2001 | Carney | G07D 7/0047 382/137 |
| 9,729,727 B1* | 8/2017 | Zhang | H04M 15/00 |
| 2006/0124724 A1* | 6/2006 | Kotovich | G06Q 20/389 235/379 |
| 2006/0219773 A1* | 10/2006 | Richardson | G06V 30/12 235/379 |

(Continued)

FOREIGN PATENT DOCUMENTS

| | | | | |
|---|---|---|---|---|
| WO | WO-2012060893 A1 * | 5/2012 | ........... | G06Q 20/042 |
| WO | WO-2019159318 A1 * | 8/2019 | ........... | G06K 9/6218 |
| WO | WO-2019213426 A1 * | 11/2019 | ............ | G06N 20/00 |

OTHER PUBLICATIONS

David Engebos, "ARGO Fraud Solutions: Fraud and AML Solution Overview," 2022 (Year: 2022).*

(Continued)

*Primary Examiner* — Abhishek Vyas
*Assistant Examiner* — William B. Bunker
(74) *Attorney, Agent, or Firm* — Haynes and Boone, LLP

(57) ABSTRACT

A system includes collecting serial numbers over a period of time, and constructing a matrix indicating which digits have been used at which positions. For a second period of time, the system collects a second group of serial numbers and, for each of these serial numbers, identifies a feature of the serial number by comparing it against the matrix, and automatically updates the matrix with the digits and digit positions of the serial number. The features are received into an artificial intelligence model as training data. Further, the system (Continued)

collects a third group of serial numbers and, for each serial number of the third group, identifies a feature of the serial number by comparing it against the matrix. These features are then received into the artificial intelligence model, which determines a risk score. The matrix is then updated with the digits and digit positions of the serial number.

18 Claims, 10 Drawing Sheets

(56) References Cited

U.S. PATENT DOCUMENTS

| | | | | |
|---|---|---|---|---|
| 2007/0244782 | A1* | 10/2007 | Chimento | G06Q 20/00 705/35 |
| 2010/0098318 | A1* | 4/2010 | Anderson | G06V 30/2253 705/64 |
| 2012/0101925 | A1* | 4/2012 | Leibon | G06Q 40/00 705/35 |
| 2012/0109691 | A1* | 5/2012 | Thomas | G06Q 40/02 705/500 |
| 2023/0043993 | A1* | 2/2023 | Allahdadian | G06N 3/084 |

OTHER PUBLICATIONS

Todd Robertson, "Detect and Prevent Check Fraud in Real Time," Bank Director, 2022 (Year: 2022).*

Library of Congress, Structure of the LC Control Number, 1898 (Year: 1898).*

Anowar et al., "Conceptual and Empirical Comparison dimensionality reduction algorithms," Computer Science Review 40, 2021 (Year: 2021).*

Benchaji et al., Enhanced credit card detection based on attention mechanism and LSTM deep model, Journal of Big Data, 2021 (Year: 2021).*

* cited by examiner

| Name | Input Type | Function | Number of Units to Keep | Time Unit |
|---|---|---|---|---|
| normalizedAmounthMarch | Double | Count, Sum, Min, Max, StDevP | 13 | Months |
| teamCourtbyDay | Double | Count, Min, Max, StDevP, Average | 90 | Days |
| checksforlastyear | Double | District list (Count) | 2 | Years |
| agerageledgerbalance | Double | Count, Min, Max,StDevP, Average | 6 | Months |
| depositCourtbyDay | Double | Count | 30 | Days |
| teamCourtbyDayfor1yr | Double | Count | 365 | Days |
| amountPerCheckByDay | Double | Count, Sum, List | 7 | Days |
| countOutOfSequenceStable | Double | Count | 3 | Years |
| countOutOfSequenceDynamic | Double | Count | 3 | Years |
| digitPositionUsage | Double | District list (Max) | 3 | Years |
| checkClasterCurrent | Double | District list (Count, Min, Max) | 3 | Days |

FIG. 9

SYSTEM AND METHODS FOR IDENTIFYING COUNTERFEIT CHECKS USING DIMENSIONAL REDUCTION OF SERIAL NUMBERS

TECHNICAL FIELD

The subject matter described herein relates to systems, methods, and devices for identifying fraudulent serial numbers through dimensional reduction. This dimensional reduction integrated fraud management system has particular but not exclusive utility for identifying fraudulent checks.

BACKGROUND

According to the U.S. Federal Trade Commission (FTC), reports of fake checks have grown by 65 percent since 2015. In 2019, Americans reported more than 27,000 fake check scams with reported losses of more than $28 million. Fraudsters use advanced technology to print checks, which has driven the increase in losses. A working counterfeit detection model is critical to a Deposit Fraud Coverage Program.

An existing way to determine if a check is counterfeit is to see if the serial number is within a particular range expected for a given user. This requires storing all the check numbers a customer has generated or used, however, which requires significant computing resources and storage space and is therefore a challenge for banks. Since the check volume of certain banks is in the range of millions per day, having all the numbers pulled from a database or memory is a very expensive and demanding effort, and often infeasible. However, the lack of an efficiently operating detection method has resulted in poor performance for fraud management services or systems.

For example, retrieving all the previously used check numbers for a single person presents a technical challenge in identifying out-of-sequence features. If, e.g., the customer has deposited 5000 checks in the past 3 years, and all the check numbers are in the range of 5000 to 7000, then a new check deposited in the range of 9000 may be considered a high-risk check. Current systems may therefore need to store the check number history of the customer (e.g., a moving window extending 3 years backward in time), and maintain this across a bank's entire customer base, and then fetch the data in real time. Such systems are very expensive to build and maintain, and can either slow down the processing of checks or significantly increase the computing resources required to identify fraud in real time or near-real time.

Thus, it is to be appreciated that such commonly used fraud identification systems have numerous drawbacks, including slow speed, large storage requirements, large computing requirements, large maintenance costs, and otherwise. Accordingly, long-felt needs exist for systems that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a dimensional reduction integrated fraud management system—a system for mapping check serial numbers into a memory map of all the digits a customer has used over a period of time (e.g., in the past 3 years). The system then builds smart features on top of the memory map to assess or predict a risk level for the transaction. The system described herein provides a mechanism to store the history of the checks deposited by the customer in a highly compressed format which can provide at least the same prediction efficacy as an out-of-sequence identification feature that relies on large databases of stored check numbers. In other words, instead of using a database to store all the check serial number a customer has deposited, the dimensional reduction integrated fraud management system may employ an array of position-based aggregators to store an indication of whether a particular digit has been used by the customer.

In an example, if the customer has deposited 5000 checks in the past 3 years and all the check are in the range of 5000 to 7000, the disclosed system will now store only the position and the digit usage of the checks deposited. In this case it may for example store indications that digit 5 and digit 7 have already been used in the position 4 of the check number or check serial number. The system may also store indications of all the digits in the 3, 2 and 1 position the customer has used. Now when a new check comes in which is in the range of 9000, the system is readily able to detect that it is the first time 9 in the 4th position is being used, as it not in the memory map stored for the customer.

The system therefore allows a user (e.g., a bank) or service provider to track the digit and position usage rather than storing the actual check numbers, thus resulting in very large savings in storage space and computing requirements. This process of knowing whether a digit in that position has now been determined to be effective in predicting whether the check is counterfeit, while also providing much faster system performance as, for each transaction, the system is only fetching a 10×10 matrix of digit usage and position rather than an entire check history for the customer.

The dimensional reduction integrated fraud management system disclosed herein has particular utility for identifying fraudulent checks, but can also be used to identify anomalous serial numbers in other applications, including but not limited to machines or machine parts, identification documents, currency, and otherwise.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect of the dimensional reduction integrated fraud management system includes a system for detecting anomalous serial numbers. The system includes a processor and a computer readable medium operably coupled thereto, the computer readable medium including a plurality of instructions stored in association therewith that are accessible to, and executable by, the processor, to perform operations which include: for a first period of time, collecting a first group of serial numbers issued by an issuer; automatically constructing a matrix from the first group of serial numbers, the matrix including: an axis representing a serial number digit position; an axis representing available digits; a logical variable for each combination of serial number digit position and available digit, where the respective logical variable is true if the respective available digit has been used in the respective serial number digit position by at least one serial number of the first group of serial numbers, and where the respective logical variable is false if the respective available digit has not been used in the respective serial number digit position by at least one serial number of the first group of serial numbers. The system also includes, for a second period of time, collecting a second group of serial numbers issued by the issuer. The system also includes, for each serial number of the second group of serial numbers: automatically identifying a respective first feature of the serial number by comparing the serial number against the matrix automatically updating the matrix with digits and digit positions of the serial number; and receiving at least some of the respective first features into an artificial intelligence model as training data. The system also includes, for a third period of time, collecting a third group of serial numbers issued by the issuer and, for each serial number of the third group of serial numbers: automatically identifying a respective second feature of the serial number by comparing the serial number against the matrix; with the artificial intelligence model, determining a risk score for the serial number based on the respective second feature; and automatically updating the matrix with digits and digit positions of the serial number. Other embodiments of this aspect include corresponding computer systems, apparatus, and computer programs recorded on one or more computer storage devices, each configured to perform the actions of the methods.

Implementations may include one or more of the following features. In some embodiments, the operations further include: for a fourth period of time, collecting a fourth group of serial numbers issued by the issuer; for each serial number of the fourth group of serial numbers: automatically identifying a respective third feature of the serial number by comparing the serial number against the matrix; automatically updating the matrix with digits and digit positions of the serial number; and receiving at least some of the respective third features into an artificial intelligence model as training data. In some embodiments, at least one respective first feature, second feature, or third feature includes, for a digit position of the serial number, whether the matrix shows that the digit in that digit position is a first occurrence of that digit in that digit position. In some embodiments, at least one respective first feature, second feature, or third feature includes a total number of first occurrences for the serial number. In some embodiments, at least one respective first feature, second feature, or third feature includes, for a first occurrence, a numerical distance between the digit and the nearest used digit for that digit position within the matrix. In some embodiments, at least one respective first feature, second feature, or third feature includes, for a first occurrence, a distance between the digit position and the nearest used digit position within the matrix. In some embodiments, the artificial intelligence model is a machine learning model. In some embodiments, the first n digits of each serial number of the first, second, and third groups of serial numbers are ignored, where the value of n is 1, 2, 3, 4, or 5. In some embodiments, the operations further include deleting, from the matrix, data regarding serial numbers older than n months, where n is selected to be greater than 12 and less than 60. In some embodiments, the serial numbers are check numbers for a checking account, the issuer is a checking account holder, and the risk score represents a risk that a check is fraudulent. In some embodiments, the serial numbers are 10-digit numbers, and the matrix is a 10 by 10 matrix. In some embodiments, the first period of time is about 7 months and the second period of time is about 3 months. In some embodiments, automatically updating the matrix occurs for a plurality of serial numbers at once. Implementations of the described techniques may include hardware, a method or process, or computer software on a computer-accessible medium.

One general aspect includes a computer-implemented method for detecting anomalous serial numbers. The computer—implemented method also includes, for a first period of time, collecting a first group of serial numbers issued by an issuer; automatically constructing a matrix from the first group of serial numbers, the matrix including: an axis representing a serial number digit position; an axis representing available digits; a logical variable for each combination of serial number digit position and available digit, where the respective logical variable is true if the respective available digit has been used in the respective serial number digit position by at least one serial number of the first group of serial numbers, and where the respective logical variable is false if the respective available digit has not been used in the respective serial number digit position by at least one serial number of the first group of serial numbers. The computer-implemented method also includes, for a second period of time, collecting a second group of serial numbers issued by the issuer and, for each serial number of the second group of serial numbers: automatically identifying a respective first feature of the serial number by comparing the serial number against the matrix automatically updating the matrix with digits and digit positions of the serial number; and receiving at least some of the respective first features into an artificial intelligence model as training data. The computer-implemented method also includes, for a third period of time, collecting a third group of serial numbers issued by the; and for each serial number of the third group of serial numbers: automatically identifying a respective second feature of the serial number by comparing the serial number against the matrix; with the artificial intelligence model, determining a risk score for the serial number based on the second feature; and automatically updating the matrix with digits and digit positions of the serial number. Other embodiments of this aspect include corresponding computer systems, apparatus, and computer programs recorded on one or more computer storage devices, each configured to perform the actions of the methods.

Implementations may include one or more of the following features. In some embodiments, the method further includes: for a fourth period of time, collecting a fourth group of serial numbers issued by the issuer; for each serial number of the fourth group of serial numbers: automatically identifying a respective third feature of the serial number by comparing the serial number against the matrix; automatically updating the matrix with digits and digit positions of the serial number; and receiving at least some of the respective third features into an artificial intelligence model as training data. In some embodiments, at least one respective first feature, second feature, or third feature includes at least one of: for a digit position of the serial number, whether the matrix shows that the digit in that digit position is a first occurrence of that digit in that digit position; or a total number of first occurrences for the serial number; or for a first occurrence, a numerical distance between the digit and the nearest used digit for that digit position within the matrix; or for a first occurrence, a distance between the digit position and the nearest used digit position within the matrix. In some embodiments, the serial numbers are check numbers for a checking or savings account, the issuer is an account holder, and the risk score represents a risk that a check is fraudulent. Implementations of the described techniques may include hardware, a method or process, or computer software on a computer-accessible medium.

One general aspect includes a non-transitory computer-readable storage medium storing instructions. The instructions include, for a first period of time, collecting a first group of serial numbers issued by an issuer; automatically constructing a matrix from the first group of serial numbers, the matrix including: an axis representing a serial number digit position; an axis representing available digits; a logical variable for each combination of serial number digit position and available digit, where the respective logical variable is true if the respective available digit has been used in the respective serial number digit position by at least one serial number of the first group of serial numbers, and where the respective logical variable is false if the respective available digit has not been used in the respective serial number digit position by at least one serial number of the first group of serial numbers. The instructions also include, for a second period of time, collecting a second group of serial numbers issued by the issuer; and, for each serial number of the second group of serial numbers: automatically identifying a respective first feature of the serial number by comparing the serial number against the matrix automatically updating the matrix with digits and digit positions of the serial number; receiving at least some of the first features into an artificial intelligence model as training data. The instructions also include, for a third period of time, collecting a third group of serial numbers issued by the issuer; for each serial number of the third group of serial numbers: automatically identifying a respective second feature of the serial number by comparing the serial number against the matrix; with the artificial intelligence model, determining a risk score for the serial number based on the second feature; and automatically updating the matrix with digits and digit positions of the serial number. Other embodiments of this aspect include corresponding computer systems, apparatus, and computer programs recorded on one or more computer storage devices, each configured to perform the actions of the methods.

Implementations may include one or more of the following features. In some embodiments, at least one respective first feature or second feature includes at least one of: for a digit position of the serial number, whether the matrix shows that the digit in that digit position is a first occurrence of that digit in that digit position; or a total number of first occurrences for the serial number; or for a first occurrence, a numerical distance between the digit and the nearest used digit for that digit position within the matrix; or for a first occurrence, a distance between the digit position and the nearest used digit position within the matrix. In some embodiments, the instructions further include: for a fourth period of time, collecting a fourth group of serial numbers issued by the issuer; for each serial number of the fourth group of serial numbers: automatically identifying a respective third feature of the serial number by comparing the serial number against the matrix; automatically updating the matrix with digits and digit positions of the serial number; and receiving at least some of the respective third features into an artificial intelligence model as training data. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the dimensional reduction integrated fraud management system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 9 shows an example user interface screen of an example dimensional reduction integrated fraud management system, according to at least one embodiment of the present disclosure.

DETAILED DESCRIPTION

Figure 1:
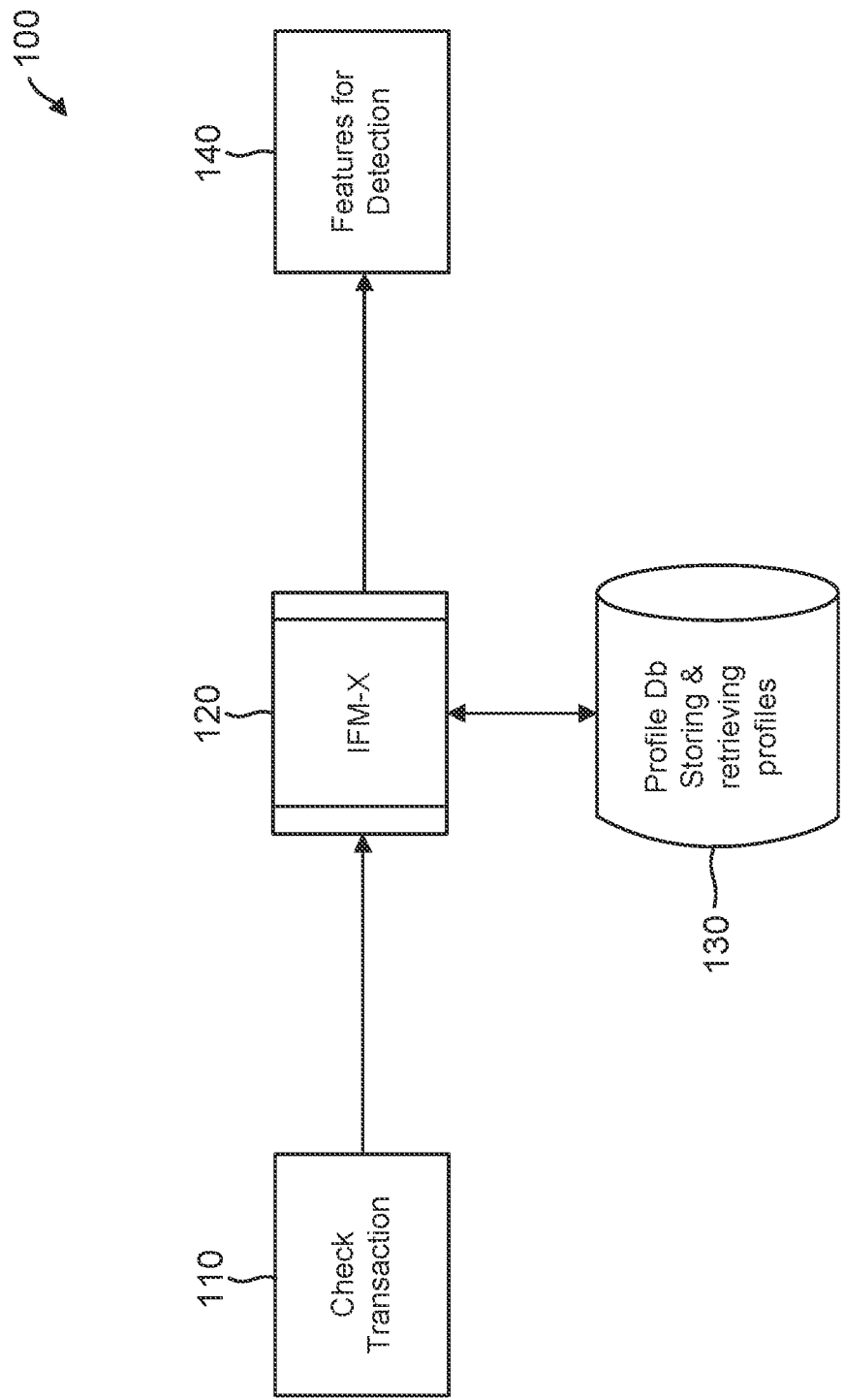
FIG. 1 is a representation, in block diagram form, of an example dimensional reduction integrated fraud management system, in accordance with at least one embodiment of the present disclosure.

In accordance with at least one embodiment of the present disclosure, a dimensional reduction integrated fraud management system is provided which reduces the storage requirements and computing resources required to identify fraudulent checks, while also improving the speed and/or throughput of the serial number analysis.

Some existing systems may store, in a database, hundreds, thousands, or millions of checks, depending on the scale of the system over a limited time. The checks may for example be sorted in the order in which they came in. An incoming check is then compared against the limited information available, due to the sizing and response time restrictions. Other existing systems may for example calculate the range between the minimum and maximum check in a given period, and then determine whether a deposited check is within that range, close to that range, or distant from that range. Such systems can be limited in both speed and efficacy.

The present disclosure addresses the real-world implementation of assessing the sequence of checks in a high-volume customer base (e.g., in the range of 1 to 2 million checks deposited in 6 months by a single commercial customer) for fraud risk evaluation. The disclosed system provides an array of, for example, between from 0 to 400 bytes for storing a single customer's check history over 3 years, as compared to a requirement of e.g., 0 to 100 megabytes for existing systems.

The disclosed system's detection accuracy can be at least as good as those of existing systems, while detecting counterfeit checks in a much smaller memory footprint and using e.g., 1% of the computing time. The disclosed system performs a dimensional reduction of the serial number data set, and only stores the memory of the check number digit occurrences, which provides a way to retrieve the usage of a check serial number digit in that location. The disclosed system builds a profile of check number positions and usage, rather than storing the actual digits.

This dimensional reduction is then used to create new features for training machine learning (ML) models for counterfeit detection. The resulting system may for example have a lift rate of 35% for the detection of counterfeit checks. Lift rate can be described as a ratio of target response to average response (e.g., target response divided by average response). For example, if a population has an average response rate of 5%, but a certain model (or rule) has identified a segment with a response rate of 20%. Then that segment could be described as having a lift of 4.0 (20%/5%). Such a lift rate covers fraud cases at high-volume clients that are missed by present systems. Large commercial customers (e.g., insurance firms) issue thousands of checks per day. To store and review each and every check in memory over multiple months may be extremely challenging for solutions which run close to realtime. The present disclosure handles this by using a dimensional reduction, with a consequently small memory footprint.

By comparison the current benchmark for a lift rate of a feature is just 6%. Thus, in some cases, the dimensional reduction integrated fraud management system may be up to 5× more effective than existing systems, as well as being faster and less resource-dependent.

In an example, one U.S.-based customer's existing system generates 25,000 to 30,000 alerts per day, at a detection rate of 30%, whereas tests with the dimensional reduction integrated fraud management system with ML model have shown a 67% detection rate with 8000 alerts. In other words, the disclosed system provides a higher rate of true positive detections and a lower rate of false positives.

In one example, the ML model with an XGboost algorithm has a gain of 0.0868, and ranked number one as compared with existing fraud detection methods.

analyst to prevent counterfeit checks. Traditionally, only rule-based models are used; the introduction of machine learning models, combined with dimensional reduction, enables significant improvement to such a system and method.

Check counterfeit prevention and detection software can use the dimensional reduction integrated fraud management system to enhance its capability to detect counterfeit checks. Increased performance of the counterfeit detection model compared to previous models can point to the use of the dimensional reduction integrated fraud management system. Products employing dimensional reduction and ML feature detection may for example see a sudden increase in detection accuracy and very low false positive rate.

The present disclosure aids substantially in detecting anomalous serial numbers in real time or near-real time, by reducing storage requirements and processing time, increasing detection rates, and lowering the rate of false positives. Implemented on a processor in communication with a memory structure or database, the system disclosed herein provides practical reductions in successful check fraud. This improved detection method transforms a slow, resource-intensive, inaccurate rule-based process into a fast, accurate, resource-efficient machine learning process, without the normally routine need to store and process each customer's entire check number history. This unconventional approach improves the functioning of the counterfeit detection computer system (e.g., an integrated fraud management computer system), by reducing the storage and computing time burdens on the processor, while increasing throughput.

The dimensional reduction integrated fraud management system may be implemented as a process at least partially viewable on a display, and operated by a control process executing on a processor that accepts user inputs from a keyboard, mouse, or touchscreen interface, and that is in communication with one or more databases. In that regard, the control process performs certain specific operations in response to different inputs or selections made at different times. Certain structures, functions, and operations of the processor, display, sensors, and user input systems are known in the art, while others are recited herein to enable novel features or aspects of the present disclosure with particularity.

Glossary

IFM: Integrated fraud management system. A system of one or more processors executing instructions to detect fraudulent check numbers.

Profile: In the context of this document, a profile may be an aggregation of data on a particular entity. The aggregation can be a count, sum, average, etc.

JSON: JSON (JavaScript Object Notation) is a lightweight data-interchange format. It may be relatively easy for humans to read and write, and for machines to parse and generate. It is based on a subset of the JavaScript Programming Language Standard ECMA-262 3rd Edition—December 1999. JSON is a text format that may be language-independent, but uses conventions that may be familiar to

| Rank | Feature | Gain | Cover | Frequency |
| --- | --- | --- | --- | --- |
| 1 | NUM_aisvar_numberofmissingdigits | 0.0868 | 0.0319 | 0.006 |

The dimensional reduction with ML feature detection can also be directly used in a rule engine to generate alerts on the incoming checks. This can for example be worked by a fraud programmers of the C-family of languages, including C, C++, C #, Java, JavaScript, Perl, Python, and others.

These descriptions are provided for exemplary purposes only, and should not be considered to limit the scope of the dimensional reduction integrated fraud management system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a representation, in block diagram form, of an example dimensional reduction integrated fraud management system 100, in accordance with at least one embodiment of the present disclosure. The high-level architecture of system 100 is shown, and includes a check transaction 110 (e.g., a customer attempting to deposit a check into a checking or savings account), and an integrated fraud management (IFM) module or analytics server 120 that communicates with a profile database 130 and outputs detectable features 140.

In an example, the dimensional reduction integrated fraud management system 100 provides the ability to accurately detect and prevent first-party check fraud, make real-time decisions, and offer immediate funds availability for legitimate transactions. It provides a holistic, cross-channel view of the customer for a clearer picture of deposit risk. When a customer writes a check from Bank A and gives it to Payee, the Payee deposits the check in another Bank B for clearance. The Bank B then send the check back to the Bank A to retrieve the funds. This process is called clearing the check. When the Bank A receives the check for clearing, it uses the dimensional reduction integrated fraud management system 100 to evaluate whether the transaction is fraudulent (e.g., the check is counterfeit) or not.

The check transaction 110 may for example generate a JSON request or other digital representation by the bank that is sent to the IFM module 120. The IFM module or analytics server 120 then parses the transaction, by performing a process called data mapping, where it takes the data in the check transaction and maps into the IFM module 120. Once the IFM module 120 completes the mapping, the next step is to enhance the transaction by fetching any additional data for the check, such as the customer profile for that check, from the profile database 130. The IFM module then calculates features 140 which are based on the profile data stored previously on the customer. Once the features 140 are calculated, they can be passed to a machine learning (ML) algorithm (see FIG. 2), other artificial intelligence algorithm, or other type of algorithm for anomaly detection, to provide risk measurements to the risk case manager. The response could be, for example, to generate an alert yes or no. At the same time, information from the check transaction 110 may also be persisted into the profile database 130 (e.g., incorporated into a 10×10, 10×N, N×10, or N×N matrix of digit position usage information).

The profile database may for example be populated by collecting serial numbers over a period of time (e.g., 7 months), and constructing a matrix for each customer or account indicating which digits have been used at which positions in the collected serial numbers. The ML algorithm may for example be trained by collecting serial numbers over a second period of time (e.g., 3 months) and, for each serial number of the second group, identifying a feature of the serial number by comparing it against the matrix, and automatically updating the matrix with the digits and digit positions of the serial number. The features of the serial numbers are received into the artificial intelligence model as training data. Once the training period has completed, the ML model may be ready for ongoing use in detecting anomalous check numbers.

In some embodiments, the matrix or the ML model may be updated or retrained periodically on a regular schedule (e.g., to remove "stale" check numbers older than 1 year, older than 5 years, etc.). In some embodiments, the matrix or the ML model may be updated or retrained as a result of an environmental change that degrades the effectiveness of the existing model. For example, when a significant number of fraudulent checks are detected and intercepted over a period of time, fraudsters may change their behavior, thus invalidating the assumptions of the existing ML model.

Before continuing, it should be noted that the examples described above are provided for purposes of illustration, and are not intended to be limiting. Other devices and/or device configurations may be utilized to carry out the operations described herein.

Figure 2:
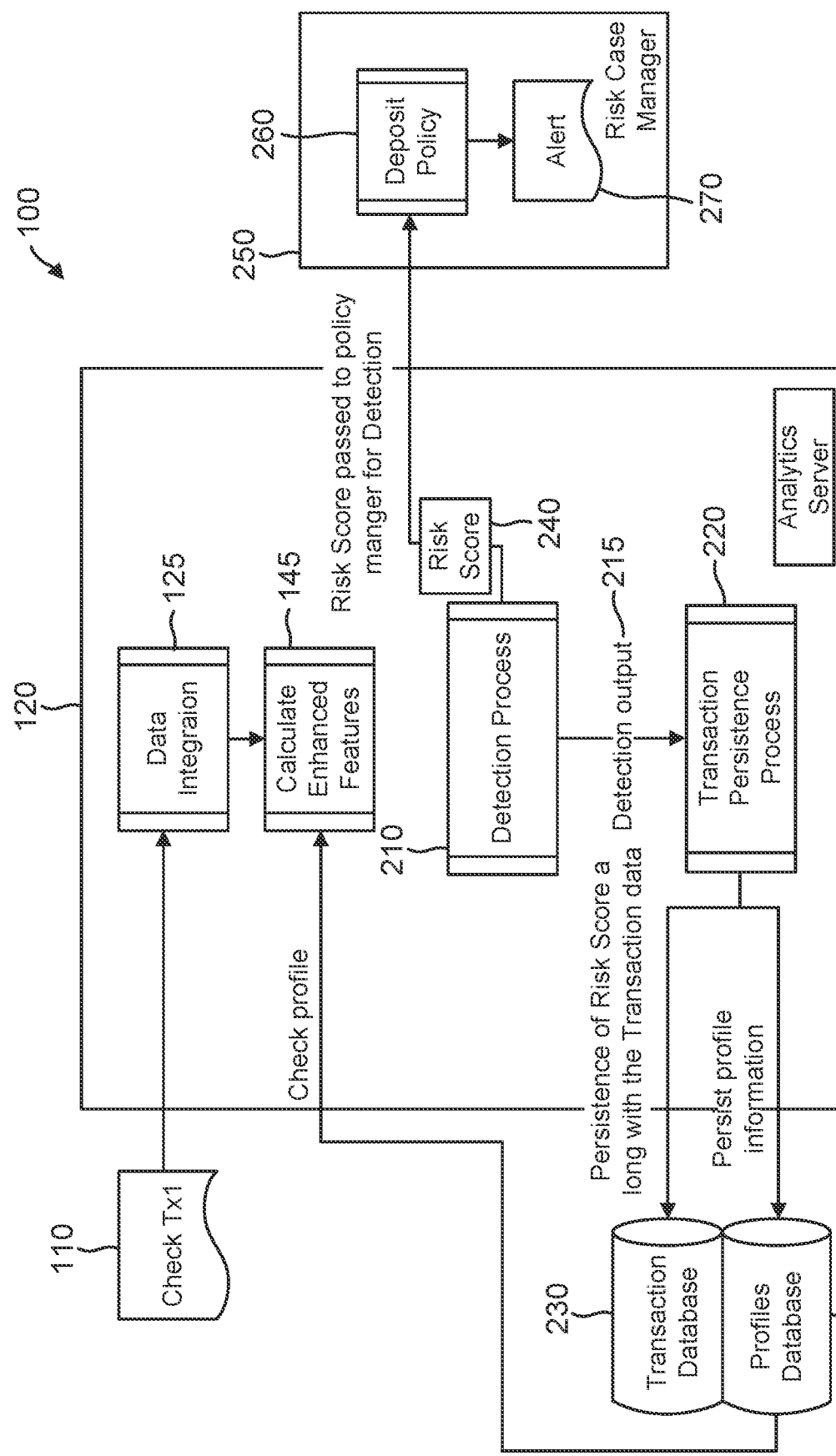
FIG. 2 is a representation, in block diagram form, of an example dimensional reduction integrated fraud management system in accordance with at least one embodiment of the present disclosure.

FIG. 2 is a representation, in block diagram form, of an example dimensional reduction integrated fraud management system 100 in accordance with at least one embodiment of the present disclosure. FIG. 2 provides a more detailed view than FIG. 1. Visible are the check transaction 110, IFM module or analytics server 120, and profile database 130. In the example shown in FIG. 3, the IFM module or analytics server 120 includes a data integration module 125, an enhanced feature calculation module 145, a detection process 210 (e.g., an ML-based fraudulent check detection process), a transaction persistence process 220, and a generated risk score 240. Also visible are a transaction database 230 and risk case manager 250. The risk case manager 250 includes a deposit policy 260 and a generated alert 270. In some embodiments, the generated alert 270 may for example be a binary yes or no, indicating whether the check transaction 110 is believed to be fraudulent. In other embodiments, an alert 270 may be generated only when the check transaction 110 is believed to be fraudulent, whereas if the check transaction 110 is believed to be valid, no alert 270 is generated.

The data integration module 125 may for example generate information about which digits are used in which digit positions of the check number described in the check transaction 110. The enhanced feature calculation module 145 accepts this data from the the data integration module 125, as well as profile information (e.g., an N×N matrix indicating which digits have been used in which digits by this customer) from the profile database 130. The enhanced features are then passed to the detection process 210, which generates a risk score 240, which is passed to the risk case manager 250, where the deposit policy 260 may generate an alert 270 based on the risk score 240.

At the same time, the detection output 215 from the detection process 210 may also be persisted into the transaction database 230 and the profile database 130 by the transaction persistence process 220. The transaction database 230 may for example hold all the information on the check transaction 110, or a large number of historical transactions, whereas the profile database may hold information about past check transactions in an aggregated format (e.g., an N×N matrix).

Figure 3:
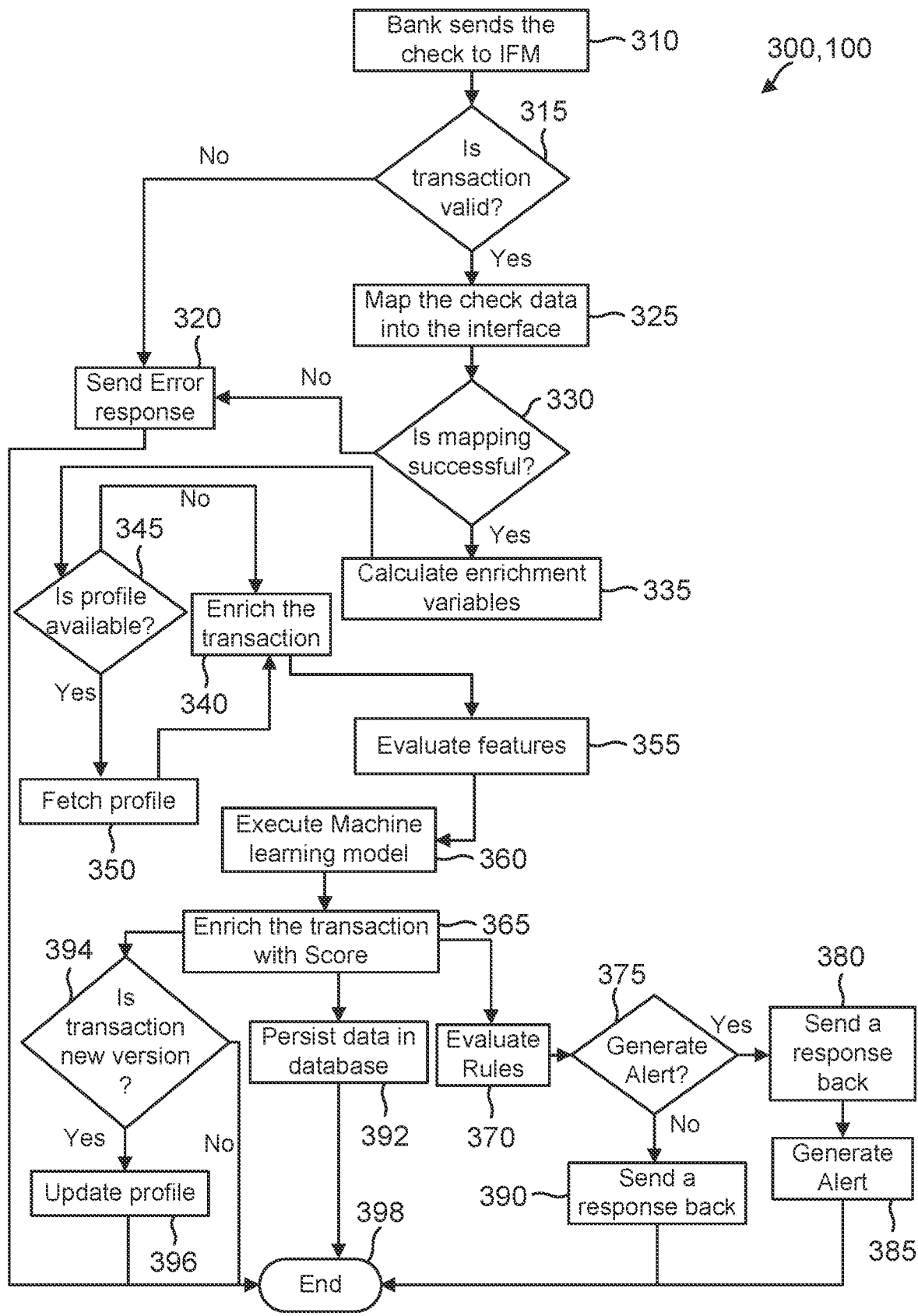
FIG. 3 shows a flow diagram of an example method performed by the dimensional reduction integrated fraud management system, in accordance with at least one embodiment of the present disclosure.

FIG. 3 shows a flow diagram of an example method 300 performed by the dimensional reduction integrated fraud management system 100, according to at least one embodiment of the present disclosure. It is understood that the steps of method 300 may be performed in a different order than shown in FIG. 3, additional steps can be provided before, during, and after the steps, and/or some of the steps described can be replaced or eliminated in other embodiments. One or more of steps of the method 300 can be carried by one or more devices and/or systems described herein, such as components of the system 100 and/or processor circuit 1050 (see FIG. 10).

This flow diagram is provided for exemplary purposes; a person of ordinary skill in the art will recognize myriad variations that nonetheless fall within the spirit and content of the present disclosure. The logic of FIG. 3 is shown as sequential. However, similar logic could be parallel, massively parallel, object oriented, real-time, event-driven, or otherwise, while accomplishing the same or similar functions.

When a check transaction is sent to the system 100, the transaction is persisted in the profile database. The profile database is an aggregation where for example the key for the profile may be a customer account number. For every account number, the system may store all the serial numbers in an aggregated format.

For example, an account number A(x) may reference multiple serial numbers Sn Each serial number is Sn contains digits 0-9, with a max length of 10.

When a serial number Sn for A(x) is fed into the system 100 the Sn is parsed to into respective digits in respective digit positions. This may for example be a defined set depending on the length of the serial number of the check, and can be represented as: Sn={Sn(1), Sn(2), Sn(3), Sn(4), Sn(5), Sn(6), Sn(7), Sn(8), Sn(9, Sn(10))}. Consider an example where the serial number is 4567. Now Sn(1)=7, Sn(2)=6, Sn(3)=5, Sn(4)=4. Therefore, A(x)={(1,7), (2,6), (3,5), (4,4)}.

For the next transaction, if the system 100 receives another serial number 98464, then Sn(1)=4, Sn(2)=6, Sn(3)=4, Sn(4)=8, Sn(5)=9, and A(x)={(1,7), (1,4), (2,6), (3,4), (3,5), (4,4), (4,8), (5,9)}.

The same is true for another customer with account number B(x); each transaction will have another combination of serial number digits and positions. These profiles may for example store information going back more than three years of the account's life cycle. After the three-year period, the older data may be purged automatically (e.g., the 10×10, N×10, 10×N, N×N, or other matrix may be regenerated from information stored in the transaction database and stored in the profile database).

The data structure used is an array of distinct key value pair of serial number digit and position. Serial Number profile={A(x), B(x), C(x) . . . }, A(x)={C(n,r)}, where n is the position which is between 1-10, and r is the integer 0-9 from the serial number.

In step 310 the method 300 includes receiving the check transaction into the IFM system as described above.

In step 315, the method includes determining whether the check transaction is validly constructed. If yes, execution proceeds to step 325. If no, execution proceeds to step 320.

In step 320, the method includes generating an error report, which may for example be displayed to a system operator or sent to the generating bank. Execution then proceeds to step 398.

In step 325, the method includes mapping the check number data into the IFM system as described above.

In step 330, the method includes determining whether the mapping of step 325 was successful. If no, execution proceeds to step 320. If yes, execution proceeds to step 335.

In step 335, the method includes calculating the enrichment variables, including for example the digit occurrences in the allowable digit positions. Execution then proceeds to step 345.

In step 340, the transaction is enriched via the enrichment variables and/or the customer profile if available. Execution then proceeds to step 355.

In step 345, the method includes determining whether a profile is available for this customer. If yes, execution proceeds to step 350. If no, execution proceeds to step 340.

In step 350, the method includes fetching the customer profile from the profile database as described above. An example profile may appear as follows. If Account A has been sending the check numbers 1002, 1123, 1232, then the profile may for example be a combination matrix which can store the history, in this case it is 1002, 1123, 1232. Any value which is seen is set to true (bolded in the table below):

TABLE 1

| Number | 10th position | 9th position | 8th position | 7th position | 6th position | 5th position | 4th position | 3rd position | 2nd position | 1st position |
|---|---|---|---|---|---|---|---|---|---|---|
| 0 | FALSE | FALSE | FALSE | FALSE | FALSE | FALSE | FALSE | TRUE | TRUE | FALSE |
| 1 | FALSE | FALSE | FALSE | FALSE | FALSE | FALSE | TRUE | TRUE | FALSE | FALSE |
| 2 | FALSE | FALSE | FALSE | FALSE | FALSE | FALSE | FALSE | TRUE | TRUE | TRUE |
| 3 | FALSE | FALSE | FALSE | FALSE | FALSE | FALSE | FALSE | FALSE | TRUE | TRUE |
| 4 | FALSE | FALSE | FALSE | FALSE | FALSE | FALSE | FALSE | FALSE | FALSE | FALSE |
| 5 | FALSE | FALSE | FALSE | FALSE | FALSE | FALSE | FALSE | FALSE | FALSE | FALSE |
| 6 | FALSE | FALSE | FALSE | FALSE | FALSE | FALSE | FALSE | FALSE | FALSE | FALSE |
| 7 | FALSE | FALSE | FALSE | FALSE | FALSE | FALSE | FALSE | FALSE | FALSE | FALSE |
| 8 | FALSE | FALSE | FALSE | FALSE | FALSE | FALSE | FALSE | FALSE | FALSE | FALSE |
| 9 | FALSE | FALSE | FALSE | FALSE | FALSE | FALSE | FALSE | FALSE | FALSE | FALSE |

Execution then proceeds to step 340.

In step 355, the method includes evaluating features of the enriched transaction. Features may include, for example, whether a given digit is occurring in a given digit position for the first time, and if so, how far that given digit is from the closest digit that has previously been used in that position. Features may also include a number of first occurrences, or other anomalous information or variables derived from the anomalous information. In the example shown above in step 345, if the system receives a check number 2004, then the number 4 is being seen for the first time in position 1, and number 2 is being seen for the first time seen in position 4, both bolded:

TABLE 2

| Number | 10th position | 9th position | 8th position | 7th position | 6th position | 5th position | 4th position | 3rd position | 2nd position | 1st position |
|---|---|---|---|---|---|---|---|---|---|---|
| 0 | FALSE | FALSE | FALSE | FALSE | FALSE | FALSE | FALSE | TRUE | TRUE | FALSE |
| 1 | FALSE | FALSE | FALSE | FALSE | FALSE | FALSE | TRUE | TRUE | FALSE | FALSE |
| 2 | FALSE | FALSE | FALSE | FALSE | FALSE | FALSE | FALSE | TRUE | TRUE | TRUE |
| 3 | FALSE | FALSE | FALSE | FALSE | FALSE | FALSE | FALSE | FALSE | TRUE | TRUE |
| 4 | FALSE | FALSE | FALSE | FALSE | FALSE | FALSE | FALSE | FALSE | FALSE | FALSE |
| 5 | FALSE | FALSE | FALSE | FALSE | FALSE | FALSE | FALSE | FALSE | FALSE | FALSE |
| 6 | FALSE | FALSE | FALSE | FALSE | FALSE | FALSE | FALSE | FALSE | FALSE | FALSE |
| 7 | FALSE | FALSE | FALSE | FALSE | FALSE | FALSE | FALSE | FALSE | FALSE | FALSE |
| 8 | FALSE | FALSE | FALSE | FALSE | FALSE | FALSE | FALSE | FALSE | FALSE | FALSE |
| 9 | FALSE | FALSE | FALSE | FALSE | FALSE | FALSE | FALSE | FALSE | FALSE | FALSE |

This yields a number of missing digits or first-time-occurrence digits of 2, which may increase the risk of the check, as the check has two positions which are missing.

Other example features may include:

Number of missing digits N(x): This feature provides a count of digits from a given serial number which is seen for the first time for that account. Using the same example as before, A(x) currently has the following in the memory:

$A(X) = \{(1,7), (1,4), (2,6), (3,4), (3,5), (4,4), (4,8), (5,9)\}$

Now we have a new check cleared with a serial number 6734. Before updating the profile this serial number is initially parsed into following $Sn = \{(1,4),(2,3),(3,7),(4,6)\}$.

For each Sn(i), check if it exists in A(x). If it doesn't exist, increment N(x) by 1. So in this case N(x)=3.

FirstOccurranceofnthDigits F(n): This feature provides a Boolean value is a particular position is seen for the first time. With the same example we see that Sn(4,6) is not in the set A(x), so F(4)=true. Similar calculation is done for all digits:

F(4)=True
F(3)=True
F(2)=True
F(1)=True

Example code or pseudocode for computing or evaluating features may include the following Application Interface Specification (AIS) platform logic for computing MissingDigitCount:

```
TRY_ONERROR
  IIF (
    ISNULL (INPUT.length),
    TO_DOUBLE (NULL ),
    IIF (
      INPUT.length < 3,
      TO_DOUBLE (NULL) ,
      IIF (
        INPUT.length < 5,
        SUM (
          CREATE_SET (
            CREATE_TUPLE("isNotAvailable",TO_DOUBLE
(not(IMPL_isOccueanceAtNthPosition(INPUT.instrumentNumber,3,
INPUT.digitPositionUsageSet)))),
            CREATE_TUPLE("isNotAvailable",TO_DOUBLE
(not(IMPL_isOccueanceAtNthPosition(INPUT.instrumentNumber,4,
INPUT.digitPositionUsageSet)))),
            CREATE_TUPLE("isNotAvailable",TO_DOUBLE
(not(IMPL_isOccueanceAtNthPosition(INPUT.instrumentNumber,5,
INPUT.digitPositionUsageSet)))),
          ),
          SUM (
            CREATE_SET (
              CREATE_TUPLE("isNotAvailable",TO_DOUBLE
(not(IMPL_isOccueanceAtNthPosition(INPUT.instrumentNumber,
INPUT.length-3,INPUT.digitPositionUsageSet)))),
              CREATE_TUPLE("isNotAvailable",TO_DOUBLE
(not(IMPL_isOccueanceAtNthPosition(INPUT.instrumentNumber,
INPUT.length-2,INPUT.digitPositionUsageSet)))),
              CREATE_TUPLE("isNotAvailable",TO_DOUBLE
(not(IMPL_isOccueanceAtNthPosition(INPUT.instrumentNumber,
INPUT.length-1,INPUT.digitPositionUsageSet)))),
              CREATE_TUPLE("isNotAvailable",TO_DOUBLE
(not(IMPL_isOccueanceAtNthPosition(INPUT.instrumentNumber,
INPUT.length,INPUT.digitPositionUsageSet))))
            ),isNotAvailable
          )
        )
      )
    ),
  NULL)
```

Other features may be evaluated or computed instead or in addition, and may include features not only of the check serial numbers, but also of amounts, transaction times, or other information related to the check transaction. The features may then be formatted as needed for the machine learning (ML) model. Execution then proceeds to step 360.

In step 360, the method includes executing the machine learning (ML) model to generate a risk score associated with the identified features. Execution then proceeds to step 365.

In step 365, the method includes enriching the transaction with the risk score. Execution may then proceed to any or all of steps 394, 392, or 370.

In step 370, the method includes evaluating a rule base to determine a response to the enriched profile and risk score. Execution then proceeds to step 375.

In step 375, the method includes determining whether to send an alert. If yes, execution proceeds to step 380. If no, execution proceeds to step 390.

In step 380, the method includes sending a response (e.g., to an operator, to the originating institution, etc.). Execution then proceeds to step 385.

In step 385, the method includes generating an alert (e.g., to be sent to an operator, forwarded to the originating institution, etc.). Execution then proceeds to step 398.

In step 392, the method includes persisting the enriched transaction data in the profile database and/or transaction database, as described above. Execution then proceeds to step 398.

In step 394, the method includes determining whether the transaction is a new version. For example, this may include determining whether a given digit has been used in a given digit position for the first time. If no, execution proceeds to step 398. If yes, execution proceeds to step 396.

In step 396, the method includes updating the customer profile to include the new information determined in step 394. Execution then proceeds to step 398.

In step 398, the method is complete.

Figure 4:
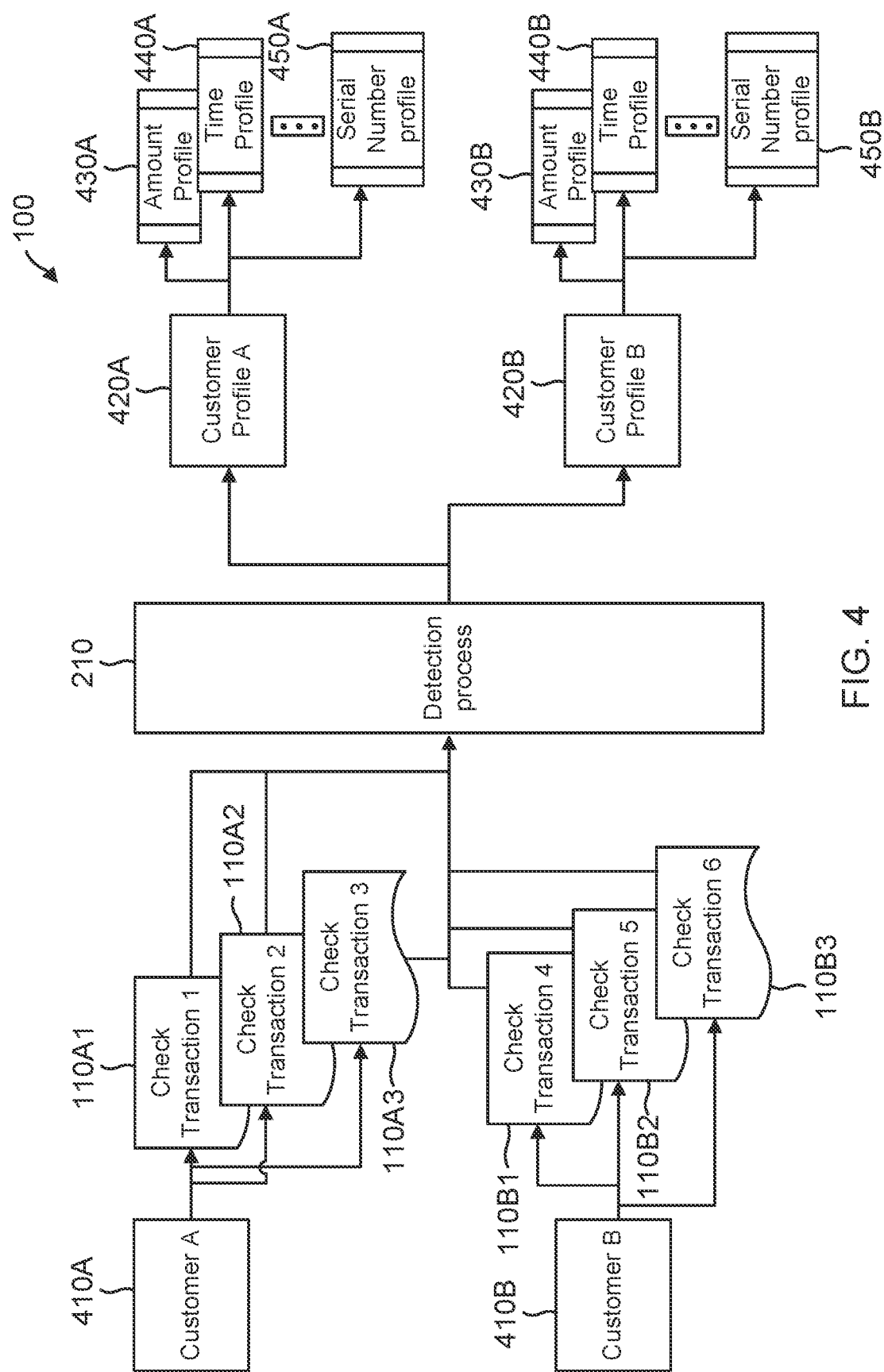
FIG. 4 is a representation, in block diagram form, of an example dimensional reduction integrated fraud management system, in accordance with at least one embodiment of the present disclosure.

FIG. 4 is a representation, in block diagram form, of an example dimensional reduction integrated fraud management system 100 in accordance with at least one embodiment of the present disclosure. Visible are two customers, 410A and 410B, each of which generates check transactions (110A1, 110A2, and 110A3 for customer 410A, and 110B1, 110B2, and 110B3 for customer 410B). The check transactions are received into the detection process 210, which generates customer profile 420A and 420B for customers A and B, respectively. Customer profile 420A includes an amount profile 430A, time profile 440A, and serial number profile 450A. Similarly, customer profile 420B includes an amount profile 430B, time profile 440B, and serial number profile 450B.

Figure 5:
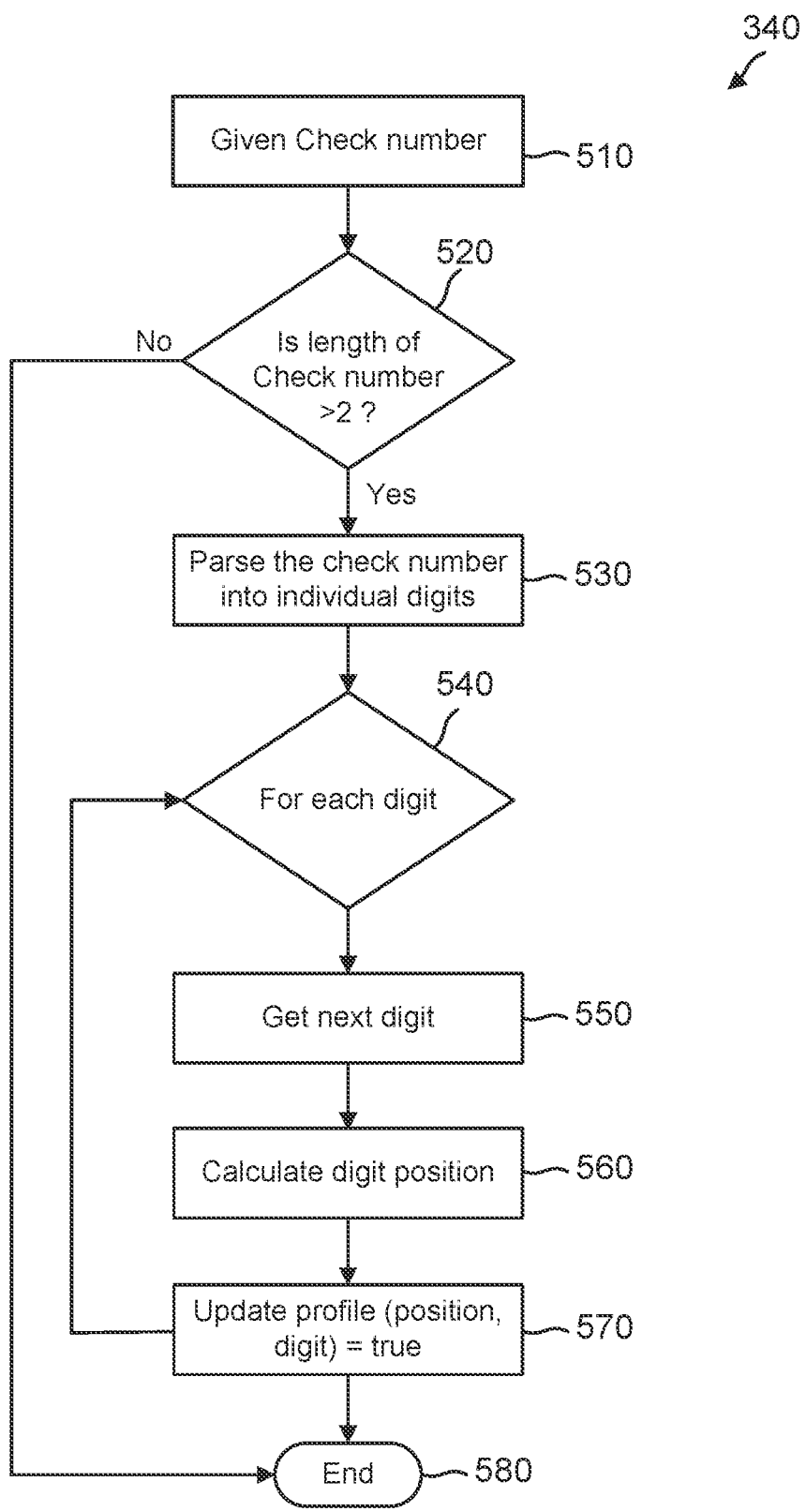
FIG. 5 shows a flow diagram of an example method that may optionally be performed by the dimensional reduction integrated fraud management system, according to at least one embodiment of the present disclosure.

FIG. 5 shows a flow diagram of an example method 340 that may optionally be performed by the dimensional reduction integrated fraud management system 100, according to at least one embodiment of the present disclosure. The example method 340 may for example correspond to step 340 of example method 300. Other enrichment steps, operations, or methods may be included instead or in addition.

In some embodiments, it may be desirable under some circumstances to ignore the first several digits of a check number. For example, if an issuer has already issued check numbers 0-5000, then all ten possible decimal digits will have appeared in each of the first three digit positions, so that these digit positions have a reduced predictive power. Thus, it may be advantageous to ignore the first 1, 2, 3, 4, or 5 digits of a check number, or some other number of digits.

In step 510, the method 340 includes receiving a given check number. Execution then proceeds to step 520.

In step 520, the method 340 includes determining whether the length of the check number is greater than 2 digits. If yes, execution then proceeds to step 530. If no, then execution proceeds to step 580. This may be done for example because two-digit check numbers are quite rare in reality, and such edge cases can result in false positives if not excluded.

In step 530, the method 340 includes parsing the check number into individual digits. Execution then proceeds to step 540.

In step 540, the method 340 includes initiating a loop that is executed for each digit of the check number or check serial number. Execution then proceeds to step 550.

In step 550, the method 340 includes getting the next digit from the next digit position. Execution then proceeds to step 560.

In step 560, the method 340 includes computing the digit position of the current digit. Execution then proceeds to step 520.

In step 570, the method 340 includes updating the customer profile associated with the check number, such that the matrix location associated with the current digit in the current digit position is set to TRUE as described above. Execution then proceeds to step 580.

In step 580, the method 340 is complete.

Figure 6:
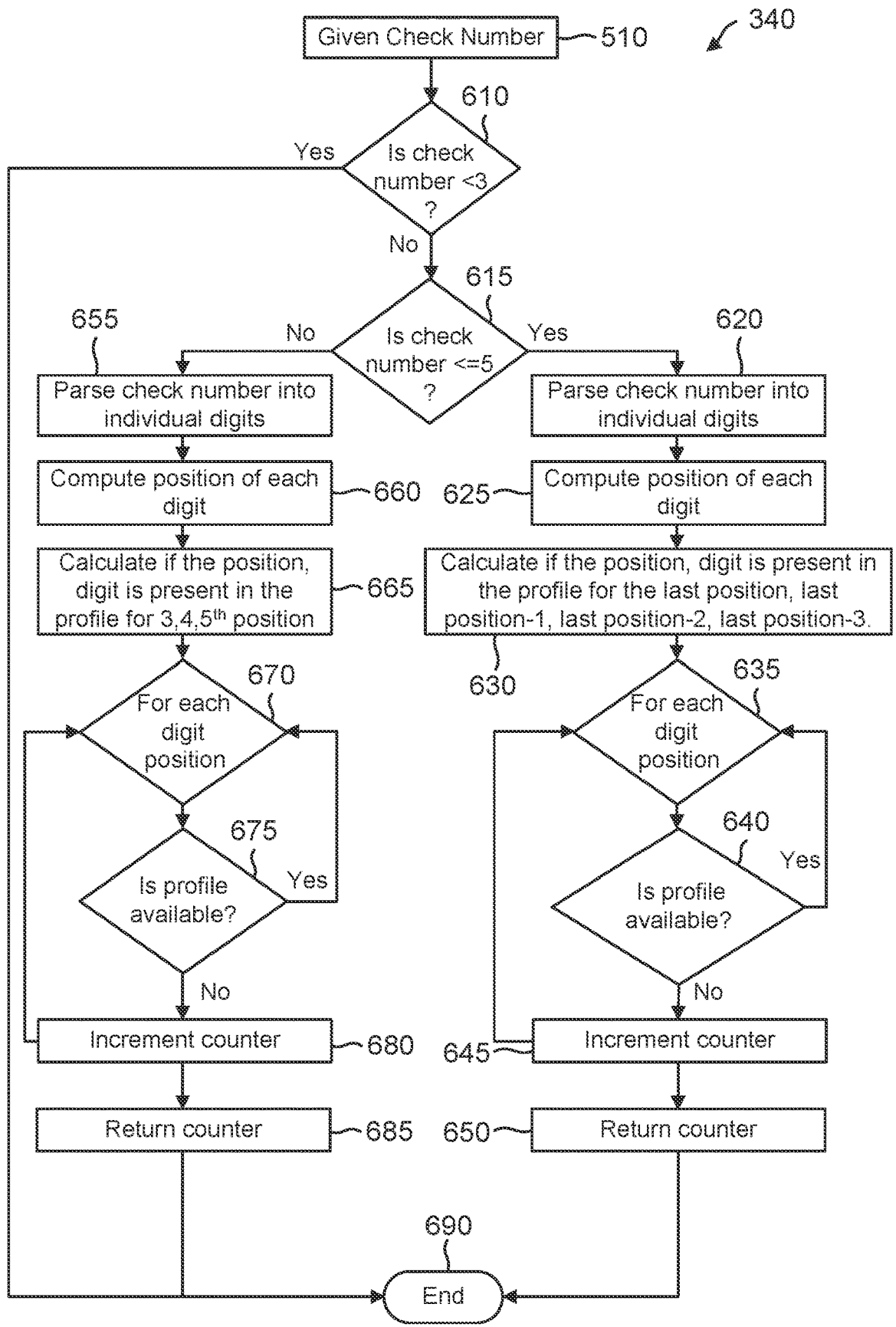
FIG. 6 shows a flow diagram of an example method that may optionally be performed by the dimensional reduction integrated fraud management system, according to at least one embodiment of the present disclosure.

FIG. 6 shows a flow diagram of an example method 340 that may optionally be performed by the dimensional reduction integrated fraud management system 100, according to at least one embodiment of the present disclosure. The example method 340 may for example correspond to step 340 of example method 300. Other enrichment steps, operations, or methods may be included instead or in addition.

In step 510, the method 340 includes receiving a given check number. Execution then proceeds to step 610.

In step 610, the method 340 includes determining whether the length of the given check number is less than 3. If yes, then execution then proceeds to step 690. If no, execution proceeds to step 615. This may be done for example because two-digit check numbers are quite rare in reality, and such edge cases can result in false positives if not excluded.

In step 615, the method 340 includes determining whether the length of the given check number is less than or equal to 5. If yes, execution proceeds to step 620. If no, execution proceeds to step 655. This may be done for example so that a smaller check number can have a different calculation than a larger check number, thus improving the accuracy and versatility of the system.

In step 620, the method 340 includes parsing the check number into individual digits. Execution then proceeds to step 625.

In step 625, the method 340 includes computing the position of each digit in the check number. Execution then proceeds to step 630.

In step 630, the method 340 includes determining whether the position and digit are present in the profile for the last position, last position-1, last position-2, or last position-3. Execution then proceeds to step 635.

In step 635, the method 340 includes initiating a loop that executes once for each digit position in the check number. Execution then proceeds to step 650.

In step 640, the method 340 includes determining whether profile data is available for the current digit position. If yes, execution returns to step 635. If no, execution proceeds to step 645. In other words, the counter may only increment when a variable is missing (e.g., when a digit is seen for the first time in the current digit position).

In step 645, the method 340 includes incrementing an anomaly counter, and then returning to step 635 if the loop is not complete (e.g., if some digit positions in the check number have not yet been evaluated), or proceeding to step 650 if the loop is complete (e.g., if all digit positions in the check number have been evaluated).

In step 650, the method 340 includes returning the value of the anomaly counter, which may for example be, or be a component of, a check number feature as described above. Execution then proceeds to step 690.

In step 655, the method 340 includes parsing the check number into individual digits. Execution then proceeds to step 660.

In step 660, the method 340 includes computing the position of each digit. Execution then proceeds to step 620.

In step 665, the method 340 includes calculating whether each digit and position is present in the profile for the $3^{rd}$, $4^{th}$, or $5^{th}$ position. Execution then proceeds to step 670.

In step 670, the method 340 includes initiating a loop that executes once for each digit position in the check number. Execution then proceeds to step 675.

In step 675, the method 340 includes determining whether profile data is available for the current digit position. If yes, execution returns to step 670. If no, execution proceeds to step 680. Again, the counter may only increment when a variable is missing (e.g., when a digit is seen for the first time in the current digit position).

In step 680, the method 340 includes incrementing an anomaly counter, returning to step 670 if the loop is not complete (e.g., if some digit positions in the check number have not yet been evaluated), or proceeding to step 685 if the loop is complete (e.g., if all digit positions in the check number have been evaluated).

In step 685, the method 340 includes returning the value of the anomaly counter, which may for example be, or be a component of, a check number feature as described above. Execution then proceeds to step 690.

In step 690, the method 340 is complete.

Figure 7:
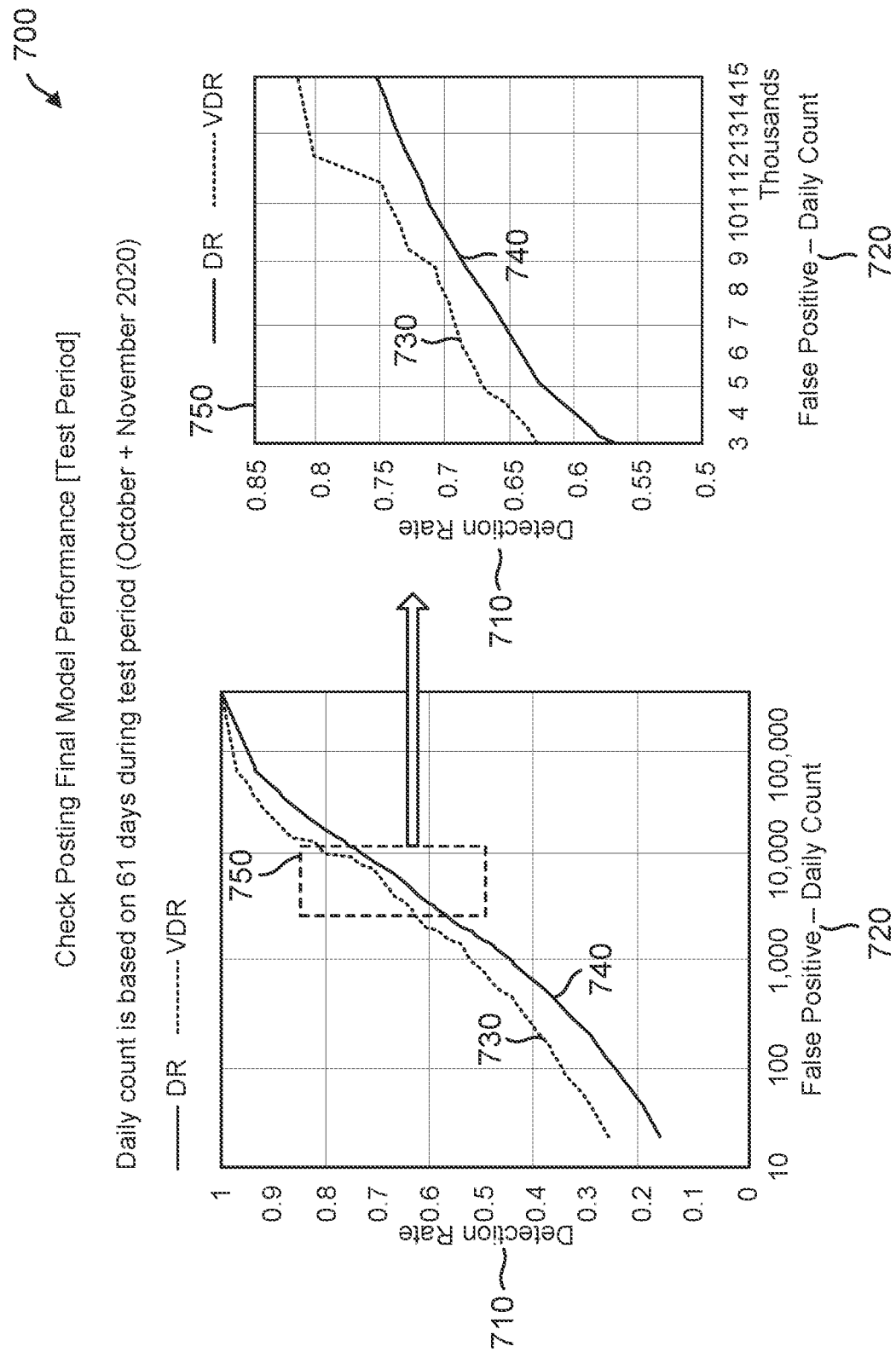
FIG. 7 is a log plot showing the fraud detection performance of an example dimensional reduction integrated fraud management system on an example data set, according to at least one embodiment of the present disclosure.

FIG. 7 is a log plot 700 showing the fraud detection performance of an example dimensional reduction integrated fraud management system on an example data set, according to at least one embodiment of the present disclosure. The graph 700 includes a vertical axis representing detection rate 710, which ranges from 0.0 (meaning no fraud detections) to 1.0 (meaning all frauds are detected). The graph 700 also includes a horizontal axis representing a daily count of false positives (e.g., valid checks flagged as potentially fraudulent), which is open-ended and is shown ranging between 10 and 500,000. Two curves are shown: curve 740 representing the detection rate (DR), and curve 730 representing the value detection rate (VDR). VDR may for example represent the percentage of monetary savings, assuming the current fraud transaction triggered a blocking action on subsequent transactions, over all fraud losses. The VDR curve 730 shows a consistently higher detection rate than the DR curve 740, by approximately 5%.

The graph 700 also includes a detail region 750. As can be seen in the graph 700, a perfect detection rate of 1.0 is theoretically achievable, but comes at the cost of approximately 500,000 false positives per day. Similarly, a false positive rate of only 20 per day is achievable, but comes at the cost of a low detection rate of just 18-28%. However, as seen in the detail region, detection rates of approximately 58-83% can be achieved with false positives of just 3,000-15,000 per day, which, depending on the implementation, may represent a significant improvement over current systems.

Figure 8:
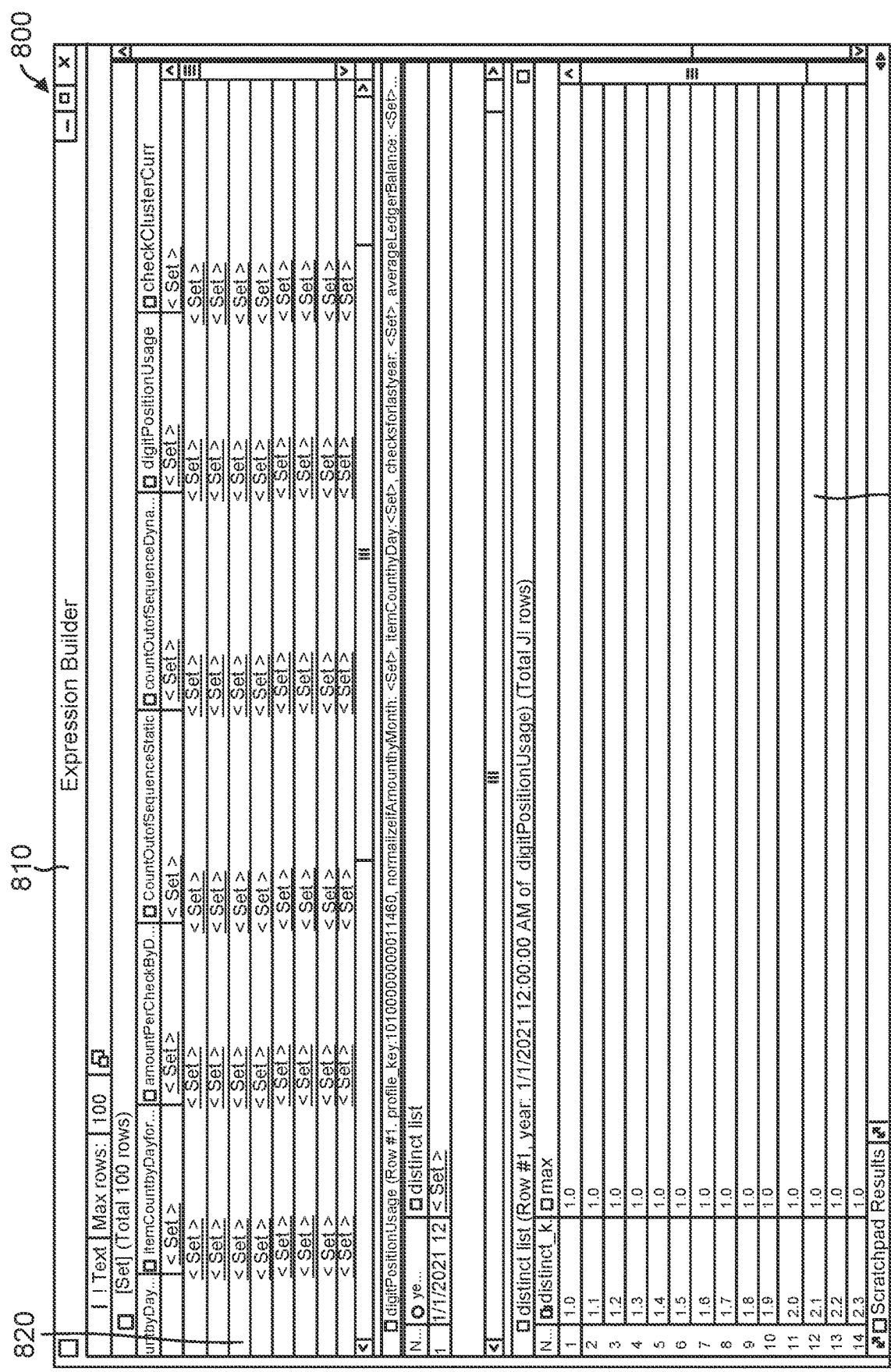
FIG. 8 shows an example user interface screen of an example dimensional reduction integrated fraud management system, according to at least one embodiment of the present disclosure.

FIG. 8 shows an example user interface screen 800 of an example dimensional reduction integrated fraud management system, according to at least one embodiment of the present disclosure. The example user interface screen 800 includes an expression builder 810 that comprises an expression editor 820, value editor 830, and list editor 840. Other user interface screens, including other features or types of features, may be used instead or in addition.

FIG. 9 shows an example user interface screen 900 of an example dimensional reduction integrated fraud management system, according to at least one embodiment of the present disclosure. The example user interface screen 900 includes a variable editor 910 that shows a plurality of variables 920. Other user interface screens, including other features or types of features, may be used instead or in addition.

Figure 10:
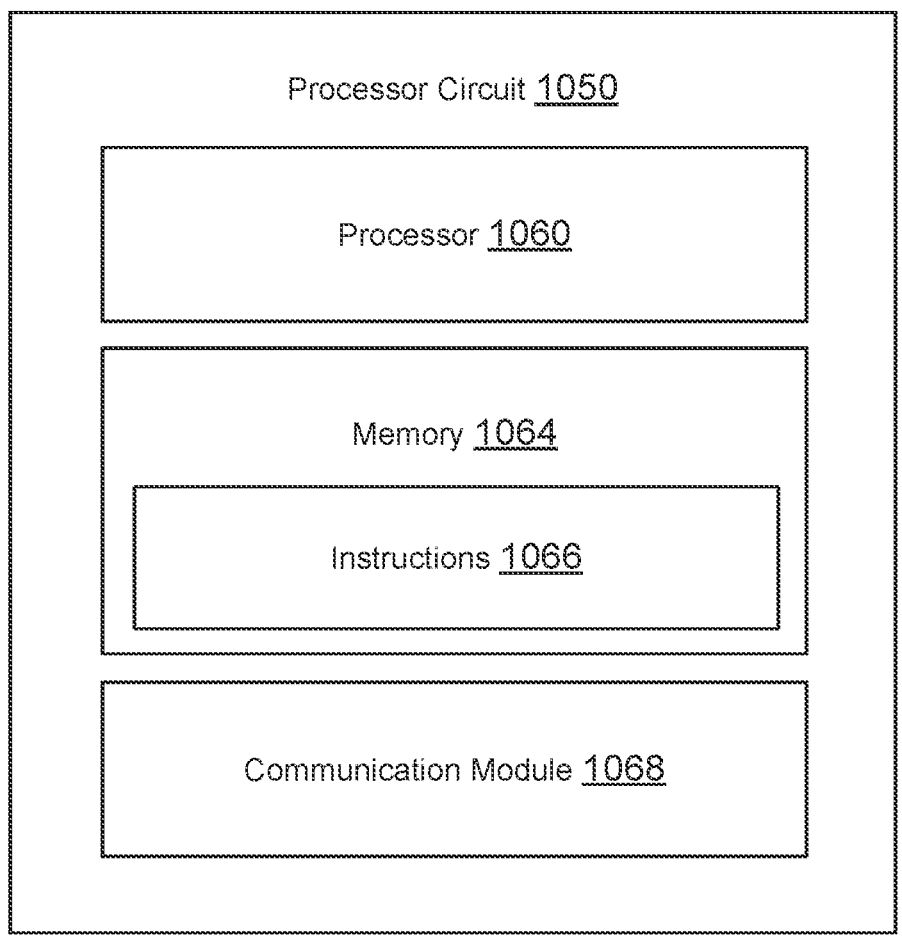
FIG. 10 is a schematic diagram of a processor circuit, in accordance with at least one embodiment of the present disclosure.

FIG. 10 is a schematic diagram of a processor circuit 1050, according to embodiments of the present disclosure. The processor circuit 1050 may be implemented in the dimensional reduction integrated fraud management system 100, or other devices or workstations (e.g., third-party workstations, network routers, etc.), or on a cloud processor or other remote processing unit, as necessary to implement the method. As shown, the processor circuit 1050 may include a processor 1060, a memory 1064, and a communication module 1068. These elements may be in direct or indirect communication with each other, for example via one or more buses.

The processor 1060 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1060 may also comprise another hardware device, a firmware device, or any combination thereof configured to perform the operations described herein. The processor 1060 may also be implemented as a combination of computing devices, e.g., a combination of a DSP and a microprocessor, a plurality of microprocessors, one or more microprocessors in conjunction with a DSP core, or any other such configuration.

The memory 1064 may include a cache memory (e.g., a cache memory of the processor 1060), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1064 includes a non-transitory computer-readable medium. The memory 1064 may store instructions 1066. The instructions 1066 may include instructions that, when executed by the processor 1060, cause the processor 1060 to perform the operations described herein. Instructions 1066 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1068 can include any electronic circuitry and/or logic circuitry to facilitate direct or indirect communication of data between the processor circuit 1050, and other processors or devices. In that regard, the communication module 1068 can be an input/output (I/O) device. In some instances, the communication module 1068 facilitates direct or indirect communication between various elements of the processor circuit 1050 and/or the dimensional reduction integrated fraud management system 100. The communication module 1068 may communicate within the processor circuit 1050 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, or preset sharing between the processor and a central server) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the dimensional reduction integrated fraud management system advantageously provides improved detection accuracy, reduced storage needs, reduces processing needs, and improved throughput as compared with existing check fraud detection systems. Accordingly, it can be seen that the dimensional reduction integrated fraud management system fills a long-standing need in the art, by addressing the limitations of present systems and allowing more transactions to be processed, more accurately.

A number of variations are possible on the examples and embodiments described above. For example, the technologies described herein may be applied to anomaly detection for the serial numbers of items other than checks, including but not limited to machines or machine parts, identification documents, currency, and otherwise, or for numbers other than serial numbers, including part numbers, monetary values, times or timestamps, dates or date stamps, etc.

The technology described herein may be implemented for numbers of arbitrary size, and may be configured in number systems other than decimal, including binary, octal, hexadecimal, etc. The dimensional reduction may occur in matrices of various sizes, both symmetric and non-symmetric, including matrices with content other than logical TRUE/FALSE values.

Accordingly, the logical operations making up the embodiments of the technology described herein are referred to variously as operations, steps, objects, elements, components, or modules. Furthermore, it should be understood that these may occur or be performed or arranged in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the dimensional reduction integrated fraud management system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the dimensional reduction integrated fraud management system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for detecting, in real time or near real time, anomalous serial numbers which are indicative of fraudulent checks, the system comprising:

a fraud management server having at least one processor and a computer readable medium operably coupled thereto, the server being in electronic communication with a computing device of a bank which is associated with a check issuer who is a customer of the bank, the server being configured to receive from the bank digital representations of the checks of the issuer, the processor comprising a check feature calculation module and a dimensionally reduced artificial intelligence model, the server being in electronic communication with a database for storing a plurality of check profiles for a plurality of issuers, the computer readable medium comprising a plurality of instructions stored in association therewith that are accessible to, and executable by, the processor, to perform operations which comprise:

for each issuer, for a first period of time, receiving from the bank computing device a first group of serial numbers issued by the issuer;

automatically constructing, using the processor, a check profile for the issuer, wherein the profile comprises a data structure comprising an array of distinct key value pairs of check serial number digits and serial number digit positions, the array comprising a matrix generated from the first group of serial numbers, the matrix comprising:

an axis representing a serial number digit position;

an axis representing available digits;

a logical variable for each pair of serial number digit positions and available digits, wherein the respective logical variable is TRUE if the respective available digit has been used in the respective serial number digit position by at least one serial number of the first group of serial numbers, and wherein the respective logical variable is FALSE if the respective available digit has not been used in the respective serial number digit position by at least one serial number of the first group of serial numbers;

generating, using the processor, training data for the model, wherein the generating comprises:

for the issuer, for a second period of time, receiving from the bank computing device a second group of serial numbers issued by the issuer;

for each serial number of the second group of serial numbers:
  automatically calculating, using the feature calculation module, a set of first features of the serial number by comparing the serial number against the matrix, wherein the features comprise one or more of anomalous digit and digit position information or the TRUE/FALSE logical variables derived from the anomalous digit information;
  automatically updating the matrix with the digits and digit positions of each serial number;
  transmitting, by the processor, at least some of the first features into the artificial intelligence model as training data;
detecting, using the processor, potentially fraudulent checks, wherein the detecting comprises:
  for the issuer, for a third period of time, receiving from the bank computing device a third group of serial numbers issued by the issuer;
  for each serial number of the third group of serial numbers:
    enhancing, by the processor, the check transaction with the profile of the issuer;
    automatically calculating, by the feature calculation module, based on the enhanced transaction, a set of second features of the serial number by comparing the serial number against the matrix;
    calculating, with the artificial intelligence model, a risk score for the serial number based on the second features;
    automatically updating, by the processor, the matrix with digits and digit positions of the serial number; and
    based on the risk score and a policy or rule base, generating an alert that the check associated with the serial number is potentially fraudulent.

2. The system of claim 1, wherein the operations further comprise:
  for the issuer, for a fourth period of time, collecting a fourth group of serial numbers issued by the issuer;
  for each serial number of the fourth group of serial numbers:
    automatically a respective third feature of the serial number by comparing the serial number against the matrix;
    automatically updating the matrix with digits and digit positions of the serial number; and
  receiving at least some of the respective third features into an artificial intelligence model as training data.

3. The system of claim 2, wherein at least one respective first feature, second feature, or third feature includes, for a digit position of the serial number, whether the matrix shows that the digit in that digit position is a first occurrence of that digit in that digit position.

4. The system of claim 2, wherein at least one respective first feature, second feature, or third feature includes a total number of first occurrences for the serial number.

5. The system of claim 2, wherein at least one respective first feature, second feature, or third feature includes, for a first occurrence, a numerical distance between the digit and the nearest used digit for that digit position within the matrix.

6. The system of claim 2, wherein at least one respective first feature, second feature, or third feature includes, for a first occurrence, a distance between the digit position and the nearest used digit position within the matrix.

7. The system of claim 1, wherein the artificial intelligence model is a machine learning model.

8. The system of claim 1, wherein the first n digits of each serial number of the first, second, and third groups of serial numbers are ignored, wherein the value of n is 1, 2, 3, 4, or 5.

9. The system of claim 1, wherein the operations further comprise deleting, from the matrix, data regarding serial numbers older than n months, wherein n is selected to be greater than 12 and less than 60.

10. The system of claim 1, wherein the serial numbers are check numbers for a checking account, the issuer is a checking account holder, and the risk score represents a risk that a check is fraudulent.

11. The system of claim 1, wherein the serial numbers are 10-digit numbers, and the matrix is a 10 by 10 matrix.

12. The system of claim 1, wherein the first period of time is about 7 months and the second period of time is about 3 months.

13. The system of claim 1, wherein automatically updating the matrix occurs for a plurality of serial numbers at once.

14. The system for detecting of claim 1, wherein the system for detecting is in real time.

15. A computer-implemented method for detecting, in real time or near real time, anomalous serial numbers which are indicative of fraudulent checks, the method comprising:
  with a fraud management server having at least one processor and a computer readable medium operably coupled thereto, the server being in electronic communication with a computing device of a bank which is associated with a check issuer who is a customer of the bank, the server being configured to receive from the bank digital representations of the checks of the issuer, the processor comprising a check feature calculation module and a dimensionally reduced artificial intelligence model, the server being in electronic communication with a database for storing a plurality of check profiles for a plurality of issuers:
    for each issuer, for a first period of time, receiving from the bank computing device a first group of serial numbers issued by the issuer;
    automatically constructing, using the processor, a check profile for the issuer, wherein the profile comprises a data structure comprising an array of distinct key value pairs of check serial number digits and serial number digit positions, the array comprising a matrix generated from the first group of serial numbers, the matrix comprising:
      an axis representing a serial number digit position;
      an axis representing available digits;
      a logical variable for each pair of serial number digit positions and available digits,
      wherein the respective logical variable is TRUE if the respective available digit has been used in the respective serial number digit position by at least one serial number of the first group of serial numbers, and
      wherein the respective logical variable is FALSE if the respective available digit has not been used in the respective serial number digit position by at least one serial number of the first group of serial numbers;
    generating, using the processor, training data for the model, wherein the generating comprises:
      for the issuer, for a second period of time, receiving from the bank computing device a second group of serial numbers issued by the issuer;
      for each serial number of the second group of serial numbers:

automatically calculating, using the feature calculation module, a set of first features of the serial number by comparing the serial number against the matrix, wherein the features comprise one or more of anomalous digit and digit position information or the TRUE/FALSE logical variables derived from the anomalous digit information;

automatically updating the matrix with the digits and digit positions of each serial number;

transmitting, by the processor, at least some of the first features into the artificial intelligence model as training data;

detecting, using the processor, potentially fraudulent checks, wherein the detecting comprises:

for the issuer, for a third period of time, receiving from the bank computing device a third group of serial numbers issued by the issuer;

for each serial number of the third group of serial numbers:

enhancing, by the processor, the check transaction with the profile of the issuer;

automatically calculating, by the feature calculation module, based on the enhanced transaction, a set of second features of the serial number by comparing the serial number against the matrix;

calculating, with the artificial intelligence model, a risk score for the serial number based on the second features;

automatically updating, by the processor, the matrix with digits and digit positions of the serial number; and based on the risk score and a policy or rule base, generating an alert that the check associated with the serial number is potentially fraudulent.

16. The computer-implemented method of claim 15, further comprising:

for the issuer, for a fourth period of time, collecting a fourth group of serial numbers issued by the issuer;

for each serial number of the fourth group of serial numbers:

automatically identifying a respective third feature of the serial number by comparing the serial number against the matrix;

automatically updating the matrix with digits and digit positions of the serial number; and receiving at least some of the respective third features into an artificial intelligence model as training data.

17. The computer-implemented method of claim 16, wherein at least one respective first feature, second feature, or third feature includes at least one of:

for a digit position of the serial number, whether the matrix shows that the digit in that digit position is a first occurrence of that digit in that digit position; or a total number of first occurrences for the serial number; or for a first occurrence, a numerical distance between the digit and the nearest used digit for that digit position within the matrix; or for a first occurrence, a distance between the digit position and the nearest used digit position within the matrix.

18. The computer-implemented method of claim 15, wherein the serial numbers are check numbers for a checking account, the issuer is a checking account holder, and the risk score represents a risk that a check is fraudulent.

* * * * *